(12) United States Patent
Sandilya et al.

(10) Patent No.: US 10,878,024 B2
(45) Date of Patent: Dec. 29, 2020

(54) DYNAMIC THUMBNAILS

(71) Applicant: Adobe Inc., San Jose, CA (US)

(72) Inventors: Srijan Sandilya, Noida (IN); Vikas Kumar, New Delhi (IN); Sourabh Gupta, Noida (IN); Nandan Jha, Ghaziabad (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 751 days.

(21) Appl. No.: 15/492,881

(22) Filed: Apr. 20, 2017

(65) Prior Publication Data

US 2018/0307399 A1 Oct. 25, 2018

(51) Int. Cl.
*G06F 16/24* (2019.01)
*G06F 16/583* (2019.01)

(52) U.S. Cl.
CPC .................. *G06F 16/583* (2019.01)

(58) Field of Classification Search
CPC ..................................... G06F 16/583
See application file for complete search history.

(56) References Cited

U.S. PATENT DOCUMENTS

| | | | | |
|---|---|---|---|---|
| 5,751,286 A * | 5/1998 | Barber | ................. | G06K 9/4647 715/835 |
| 8,589,402 B1 * | 11/2013 | Iampietro | ........... | G06F 16/5866 707/741 |
| 2003/0103673 A1 * | 6/2003 | Rathod | ............... | G06F 16/5854 382/199 |
| 2004/0230371 A1 * | 11/2004 | Vincent | .............. | G01C 21/3641 701/532 |
| 2007/0156692 A1 * | 7/2007 | Rosewarne | ............. | G06F 16/95 |
| 2007/0201749 A1 * | 8/2007 | Yamauchi | ................. | G06T 7/11 382/225 |
| 2008/0195664 A1 * | 8/2008 | Maharajh | ............... | G06Q 10/10 |
| 2009/0208118 A1 * | 8/2009 | Csurka | ............... | G06K 9/00664 382/228 |
| 2010/0054601 A1 * | 3/2010 | Anbalagan | ......... | G06K 9/00221 382/180 |
| 2010/0091330 A1 * | 4/2010 | Marchesotti | ......... | G06K 9/3233 358/1.18 |
| 2011/0016150 A1 * | 1/2011 | Engstrom | ............... | G06F 16/58 707/778 |
| 2012/0151398 A1 * | 6/2012 | Foy | ..................... | G06F 16/5866 715/769 |

(Continued)

*Primary Examiner* — Tarek Chbouki
(74) *Attorney, Agent, or Firm* — SBMC

(57) ABSTRACT

Dynamic thumbnails are described. Dynamic thumbnails provide a convenient and automated approach for providing thumbnails that are contextually relevant to a user. In at least some implementations, an input image is analyzed to generate tags describing objects or points of interest within the image, and to generate rectangles that describe the locations within the image that correspond to the generated tags. Various combinations of generated tags are analyzed to determine the smallest bounding rectangle that contains every rectangle associated with the tags in the respective combination, and a thumbnail is created. A user input is received and compared to the tags associated with the generated thumbnails, and a thumbnail that is most relevant to the user input is selected and output to the user.

20 Claims, 9 Drawing Sheets

(56) References Cited

U.S. PATENT DOCUMENTS

| | | | |
|---|---|---|---|
| 2012/0288201 A1* | 11/2012 | Raju | G06Q 30/02 |
| | | | 382/181 |
| 2013/0326338 A1* | 12/2013 | Secord | G06F 16/5866 |
| | | | 715/243 |
| 2014/0122459 A1* | 5/2014 | Frigon | G06F 3/0482 |
| | | | 707/722 |
| 2015/0317452 A1* | 11/2015 | Kozuka | G16H 15/00 |
| | | | 705/2 |
| 2016/0342624 A1* | 11/2016 | Mazur | G06Q 30/0241 |
| 2016/0364413 A9* | 12/2016 | Frigon | G06F 3/0482 |

* cited by examiner

DYNAMIC THUMBNAILS

BACKGROUND

An image typically has multiple points-of-interest or objects within it. Often, these points-of-interest and objects are identified using 'tags', allowing a user to search for an image using a text query and receive search results of images that have tags corresponding to the text query. An image in these search results is typically presented as a thumbnail which allows a user to quickly browse large quantities of images with minimal processing and/or network requirements. However, the same thumbnail is shown regardless of which tags associated with an image correspond to a query. This may result in an object that is present in an image to not be visible in the thumbnail. Accordingly, a user may incorrectly believe that the thumbnail is a 'false-positive' in the search results, i.e. the user may believe that the image is not relevant to the search query. This is problematic for both the user and the provider of the image as the user may be reviewing only a small fraction of relevant images presented to them, resulting in low download and/or purchase rates of certain images. For example, a high resolution image may contain many small objects within it, however none of the small objects are visible in a thumbnail of the image. Thus, providing a thumbnail image that is contextually relevant presents a number of challenges.

SUMMARY

This summary introduces a selection of concepts in a simplified form that are further described below in the detailed description. As such, this summary is not intended to identify essential features of the claimed subject matter, nor is it intended to be used as an aid in determining the scope of the claimed subject matter.

Dynamic thumbnails are described. Dynamic thumbnails provide a convenient approach for providing thumbnails that are contextually relevant to a user. In at least some implementations, an input image is analyzed to generate tags describing objects or points of interest within the image, and to generate rectangles that describe the locations within the image that correspond to the generated tags. Various combinations of generated tags are analyzed to determine the smallest bounding rectangle that contains every rectangle associated with the tags in the respective combination. For each bounding rectangle, a thumbnail is created that is associated with the corresponding tags. A user input is received and compared to the tags associated with the generated thumbnails, and a thumbnail that is most relevant to the user input is selected and output to the user.

The foregoing is a summary and thus contains, by necessity, simplifications, generalizations and omissions of detail; consequently, those skilled in the art will appreciate that the summary is illustrative only and does not purport to be limiting in any way. Other aspects, inventive features, and advantages of the devices and/or processes described herein, as defined solely by the claims, will become apparent in the non-limiting detailed description set forth herein.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
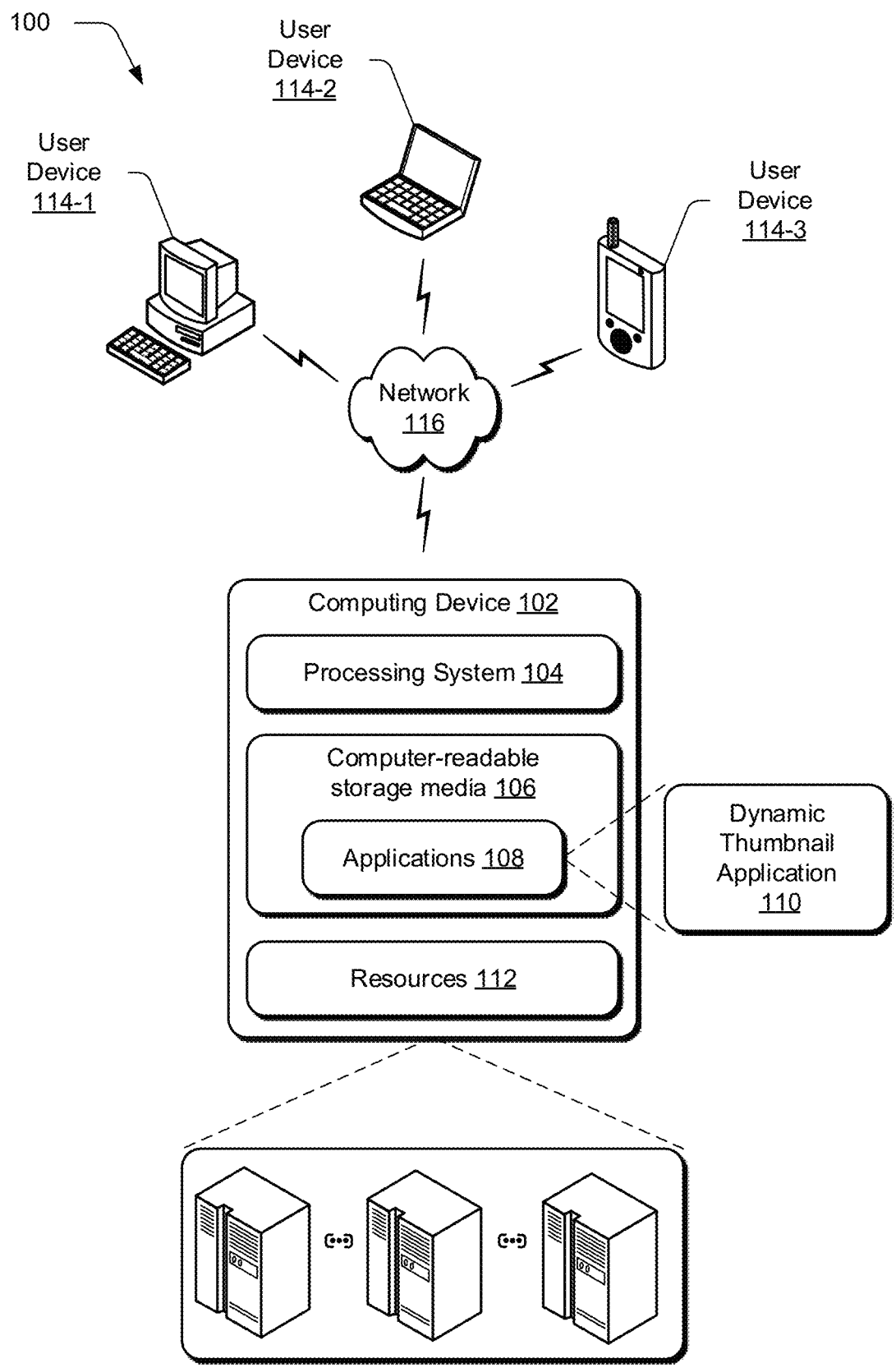
FIG. 1 is an illustration of a digital medium environment in an example implementation that is operable to employ techniques described herein.

Techniques and systems for generating dynamic thumbnails are described. Dynamic thumbnails provide a convenient approach for providing thumbnails that are contextually relevant to a user. A user, for instance, inputs a text query and receives thumbnails of images that focus on or emphasize only portions of the images that are contextually relevant to the text query. The various embodiments enable such thumbnails to be created without requiring manual intervention or cropping. These techniques not only help users quickly identify relevant images and the relevant portions within the images, but also help image providers to increase download and/or purchase rates of their images.

In at least some embodiments, a dynamic thumbnail application implemented using at least one computing device is employed to process an input image and output a dynamic thumbnail that is contextually relevant to a user. For example, a high resolution image may contain many small objects within it In a conventional thumbnail of the entire image, none of the small objects would be visible. The dynamic thumbnail application first processes the input image to generate tags describing objects or points of interest within the image, and to determine rectangles that describe the locations within the image that correspond to the generated tags. For example, the input image may include a man and a cat; the dynamic thumbnail application processes the input image to generate a tag for 'man' and a tag for 'cat', and to determine rectangles describing the location of the man and the location of the cat.

Various combinations of tags generated by the dynamic thumbnail application are analyzed to determine a bounding rectangle associated with a particular combination of tags. For a particular combination of tags, the union of associated rectangles is utilized to determine a bounding rectangle for the particular combination of tags, such that the bounding rectangle contains within it each rectangle associated with the tags in the respective combination. For example, the dynamic thumbnail application determines a bounding rectangle that contains the man, a bounding rectangle that contains the cat, and a bounding rectangle that contains both the man and the cat. In this example, the bounding rectangle that contains both the man and the cat is a bounding rectangle that contains both the bounding rectangle that contains the cat and the bounding rectangle that contains the man. The dynamic thumbnail application then creates a thumbnail corresponding to each of the bounding rectangles, such that the thumbnail is associated with the corresponding tags. Thus, in the current example, the dynamic thumbnail application creates a thumbnail of the man that is associated with the tag 'man', a thumbnail of the cat that is associated with the tag 'cat', and a thumbnail of both the man and the cat that is associated with both of the tags 'man' and 'cat'.

The dynamic thumbnail application selects a generated thumbnail as being relevant to a received user input. This includes comparing the user input to the tags associated with the generated thumbnails. Furthering the current example, the dynamic thumbnail application may receive a user input in a visual search engine, the input including 'man fishing with a cat'. The dynamic thumbnail application selects the thumbnail that includes both the man and the cat as being the most relevant thumbnail to the user's search, and outputs the selected thumbnail to the user. In some implementations, the thumbnails may be generated and indexed prior to receiving a user input. In other implementations, the thumbnails may be generated and indexed in response to receiving a user input.

In this way, the dynamic thumbnail application determines relevancy of thumbnails to a user input and may tailor thumbnails to include only relevant portions of an image. Thus, the dynamic thumbnail application avoids the limitations of conventional techniques in which a user is returned only a thumbnail of an entire image without any regard for the context in which the thumbnail is requested.

The dynamic thumbnail application may be configured in a variety of ways, such as a third-party module configured for inclusion in one or more applications being developed, as part of a stand-alone application, implemented as a web service, and so forth.

Further discussion of these and other examples is included in the following sections. In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Terminology Examples

Example descriptions or explanations of certain terms as used herein are set forth below. Each term is applicable to one or more, but not necessarily all, embodiments that are presented herein. Some terms are further described using one or more examples.

A "thumbnail" refers to a small graphical representation of an image. A thumbnail is a smaller copy associated with an original image used to help in recognizing and organizing the original images, often used in visual search engines and image organization. A digital thumbnail has a smaller file size than the original digital image, to reduce bandwidth and download time. A thumbnail may show the entirety of the original image, or alternatively may show only a part of the original image.

A "tag" refers to a label attached to an image for the purpose of identification. A tag associated with a digital image may be, for example, embedded within metadata associated with the digital image. A tag attached to an image may describe the image as a whole. Alternatively, a tag attached to an image may describe a particular object, point-of-interest, or region of the image. Tags may be transparent to a viewer of an image, such that the user may benefit from the presence of the tags without actually seeing the tags or otherwise knowing that the tags exist. Alternatively, tags may be made available to a viewer of an image. A tag may optionally be associated with a rectangle within the image, in which case the associated tag and rectangle may be referred to as a "tag rectangle".

A "rectangle" refers to a portion of a grid imposed over an image. Although the term 'rectangle' is used and generally refers to a rectangular shape, it is to be appreciated that the techniques described herein are not limited to only rectangular shapes, and a reference to a 'rectangle' may instead refer to any shape or size on a grid imposed over an image. Except where otherwise noted, a rectangle may also refer to the portion of the image that corresponds to the location of the rectangle.

A "tag rectangle" refers to a tag and a rectangle within an image that have been associated with one another. For example, a tag that describes a particular object within an image may be associated with a rectangle corresponding to the actual location at which the particular object appears within the image, and the tag and the associated rectangle are collectively referred to as a tag rectangle.

"Machine Learning" refers to technology in a digital environment that is capable of producing an output based on an input using knowledge or intelligence garnered from training. In a supervised learning implementation, training samples are input to a machine learning system during training so that the machine can learn about at least one relationship incorporated into the training samples, such as visual composition of images. After the training, a machine learning apparatus can produce an output based on an input using the learned relationship. Examples of implementation techniques for machine learning for unsupervised or supervised learning may include association rule learning, support vector machines (SVMs), Bayesian networks, regression, artificial neural networks, convolutional neural networks, deep learning, and combinations thereof. As used herein, a "machine learning system" can produce a model that incorporates a learned relationship.

A "Haystack algorithm" refers to a model produced with machine learning so as to characterize images such that an image can be compared to other images in terms of at least particular objects within the image. The comparison of specific objects within the images may include determining a likelihood that a particular unidentified object within the image is the same as or similar to an identified object within another image. A Haystack algorithm can be implemented as, for example, a processor-executable module.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a computing device 102 (e.g., a client device, a server hosting a service provider, and the like) including a processing system 104 that may include one or more processing devices, one or more computer-readable storage media 106, and various applications 108 embodied on the computer-readable storage media 106 and operable via the processing system 104 to implement corresponding functionality described herein.

In at least some implementations, the applications 108 include a dynamic thumbnail application 110. The dynamic thumbnail application 110 is configured to enable dynamic thumbnails to be generated. A number of thumbnails are created for a given image by intelligently determining what areas of the image may be of interest to a viewer. A particular thumbnail is dynamically selected to be presented to a viewer based on the context in which the viewer has requested the thumbnail, for example, based on the content of a search query. The various embodiments enable dynamic thumbnails to be created and selected without requiring any special action from the viewer.

The applications 108 may also include a web browser which is operable to access various kinds of web-based resources (e.g., lists of actions, content, and services) from servers. The applications 108 may also include an interface operable to access assets and the like from various resources, including asset stores and policy databases. The applications 108 may further include an operating system for the computing device 102 and other device applications.

The computing device 102 may be configured as any suitable type of computing device. For example, the computing device may be configured as a server, a server farm, a desktop computer, a laptop computer, a workstation, a mobile device (e.g., assuming a handheld configuration such as a tablet or mobile phone), a tablet, a router, a modem, a gateway, and so forth. Thus, the computing device 102 may range from full resource devices with substantial memory and processor resources (e.g., servers and personal computers) to a low-resource device with limited memory or processing resources (e.g., mobile devices). Additionally, the computing device 102 may be representative of a plurality of different devices, such as multiple servers in a server farm of a service provider, or a single computing device, such as a client computing device. Each of the computing devices can include some or all components of the dynamic thumbnail application 110, so that the dynamic thumbnail application 110 can be implemented on one or more devices in part or in whole. Furthermore, the computing device 102 may be representative of a plurality of different devices to perform operations "over the cloud" as further described in relation to FIG. 9.

The computing device 102 is also configured to make various resources 112 available to user devices. For instance, the digital medium environment 100 further depicts one or more user devices 114-1, 114-2, and 114-3 (collectively, user devices 114), configured to communicate with the computing device 102 over a network 116, such as the Internet, (e.g., to provide a "cloud-based" computing environment). Three user devices are shown for simplicity, though any number of suitable user devices can communicate with the computing device 102 over the network 116, such as thousands of user devices. The user devices 114 each include a web browser which is operable to access various kinds of web-based resources. In specific embodiments, the web browser is operable to access visual search engines or image databases. The user devices 114 can comprise any suitable type of user device, such as by way of example and not limitation, a desktop computer, a laptop computer, a workstation, a mobile device (e.g., assuming a handheld configuration such as a tablet or mobile phone), a tablet, a camera, a gaming station, a device configured to receive gesture input, a device configured to receive three-dimensional (3D) gestures as input, a device configured to receive speech input, a device configured to receive stylus-based input, a device configured to receive a combination of those inputs, and so forth. Thus, the user devices 114 may range from full resource devices with substantial memory and processor resources (e.g., personal computers and game consoles) to a low-resource device with limited memory or processing resources (e.g., mobile devices).

The network 116 may comprise a variety of networks, including the Internet, an intranet, local area network (LAN), wide area network (WAN), personal area network (PAN), body area network (BAN), cellular networks, terrestrial networks, satellite networks, combinations of networks, and the like, and as such may be wired, wireless, or a combination thereof.

Generally, the computing device 102 is configured to make the resources 112 available over the network 116 to clients (e.g., the user devices 114). In some scenarios, users may sign up for accounts that are employed to access corresponding resources from a provider. The provider may authenticate credentials of a user (e.g., username and password) before granting access to an account and the corresponding resources 112. The resources 112 may be licensed, purchased, or may be made freely available, (e.g., without authentication, license, or account-based access). The resources 112 can include any suitable combination of services and content made available over a network by one or more providers. Some examples of services include, but are not limited to, a photo store and/or sharing service, an online commerce service (e.g., providing sales of services and products online), a video editing service, 3-D drawing service, a photo editing service, a web development and management service, a collaboration service, a social networking service, a messaging service, an advertisement service, a movie distribution service, and so forth. Content may include various combinations of assets, including videos, ads, audio, multi-media streams, animations, images, web documents, web pages, applications, device applications, text documents, drawings, presentations, and the like.

Having considered an example digital medium environment, consider now a discussion of a digital medium environment including an example dynamic thumbnail application.

Example Dynamic Thumbnail Application

Figure 2:
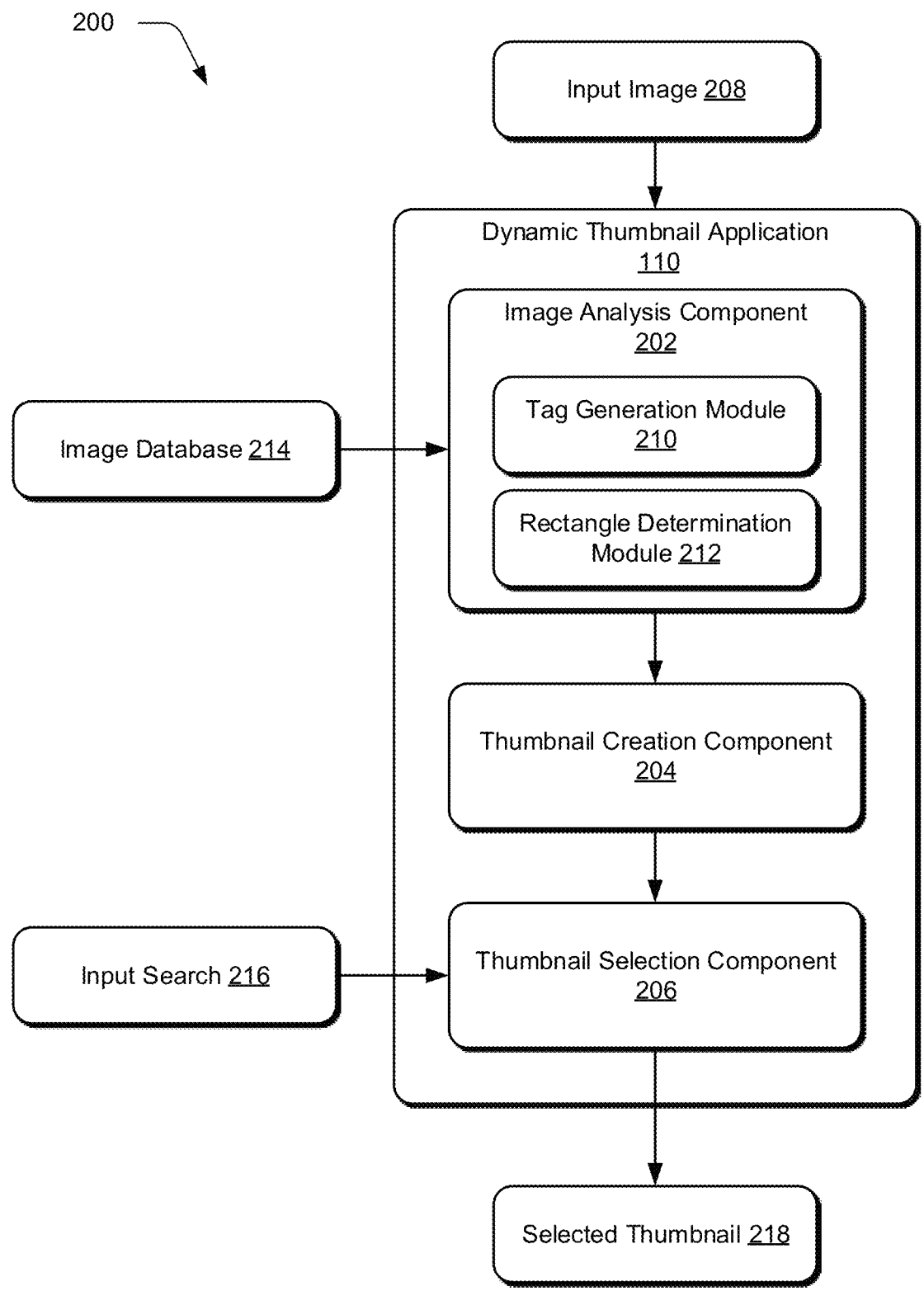
FIG. 2 is an illustration of an example implementation scenario that includes an example dynamic thumbnail application.

FIG. 2 illustrates an example implementation scenario 200 in a digital medium environment that includes an example dynamic thumbnail application 110. In this implementation, the dynamic thumbnail application 110 includes an image analysis component 202, a thumbnail creation component 204, and a thumbnail selection component 206. To begin, the dynamic thumbnail application 110 is illustrated as receiving an input image 208. For example, the dynamic thumbnail application 110 can receive data representing images captured by a camera or other image capture device. Input received by the dynamic thumbnail application 110 can include various other types of input, such as portions of captured images, data identifying objects in captured images, and so forth. Although generally described throughout as a singular image, the input image 208 may refer to multiple images, a video, and so forth.

The input image 208 in the example implementation scenario 200 is processed by the image analysis component 202 of the dynamic thumbnail application 110. The image analysis component 202 is representative of logic implemented at least partially in hardware (e.g., as a processing system and computer-readable storage medium, integrated circuit, and so on as described in relation to FIG. 9) to analyze an input image to generate tags and rectangles. This analyzing, for instance, may determine portions of an image that are identifiable as being similar to a known object in another image. A tag generation module 210 generates the tags and a rectangle determination module 212 determines the bounding rectangle positions associated with the tags.

In one or more embodiments, the tag generation module 210 uses a Haystack algorithm to compare specific objects within the input image 208 to images obtained from an image database 214. The image database 214 contains many different images that have been previously identified and annotated or labeled such that the identity of each respective image is included in metadata associated with the respective image. Comparing the specific objects within the input image 208 with the images obtained from the image database 214 may include determining a likelihood that a particular unidentified object within the input image 208 is the same as or similar to an object depicted by an image in the image database 214. When it is determined that an object in the input image 208 is sufficiently likely to be the same or similar object as depicted by an image in the image database 214, the identity of the object is retrieved from the metadata associated with the image from the image database 214. The identity of the object is then saved as a tag T for the input image 208. Many different generated tags T(i) may be saved for a single input image.

In this example, the rectangle determination module 212 uses a Haystack algorithm to determine bounding rectangle positions associated with each of the tags generated by the tag generation module 210. In some embodiments, this is performed simultaneously with the generation of the tags by the tag generation module 210 and in some embodiments may even utilize the same Haystack algorithm. The bounding rectangle positions represent the smallest region in which an identified object may be confined, R(i). When a rectangle R(i) has been determined for a generated tag T(i), the generated tag T(i) and the rectangle R(i) are saved as a tag rectangle TR(i). A tag rectangle TR(i) is created for each generated tag T(i) in the image.

Additional tags may be entered by a user. For example, the dynamic thumbnail application 110 may prompt a user to input tags associated with the input image 208. As another example, the input image 208 may contain tags in its metadata before the input image 208 is received by the dynamic thumbnail application 110. User-entered tags are saved as tags U(i) for each user-entered tag associated with the image. In at least some embodiments, one or more user-entered tags U(i) may be the same, or substantially similar, to one or more generated tags T(i). However, the user-entered tags U(i) are not associated with any bounding rectangle positions.

The image analysis component 202 maps tags from U(i) to TR(i). User-entered tags U(i) that correspond to a tag rectangle TR(i) are merged into the corresponding tag rectangle TR(i). The resultant set of user-entered tags does not contain any tags that are the same, or substantially similar, to the tags in the set of tag rectangles TR(i), and may be referred to as unmapped tags U(i).

The thumbnail creation component 204 receives the set of tag rectangles TR(i) from the image analysis component 202. The thumbnail creation component 204 is representative of logic implemented at least partially in hardware (e.g., as a processing system and computer-readable storage medium, integrated circuit, and so on as described in relation to FIG. 9) to create thumbnails from an input image and a set of tag rectangles. For each of various combinations of tag rectangles TR(i), the thumbnail creation component 204 calculates a bounding rectangle BR that is the smallest bounding rectangle that contains each tag rectangle TR(i) in the respective combination. The bounding rectangle BR is saved in the format BR(top, left, bottom, right), and is determined based on the following rules:

BR(top)=Min (TR(i)(top)) for each (i) from 1→N tag rectangles

BR(left)=Min (TR(i)(left)) for each (i) from 1→N tag rectangles

BR(bottom)=Min (TR(i)(bottom)) for each (i) from 1→N tag rectangles

BR(right)=Min (TR(i)(right)) for each (i) from 1→N tag rectangles

Using these rules, the thumbnail creation component 204 creates a bounding rectangle BR for each combination of tag rectangles TR(i) that is the union of the multiple tag rectangles TR(i) included in the respective combination. In some embodiments, the bounding rectangles BR are constrained or modified to preserve an aspect ratio, for example, 4:3 or 16:9. However, the aspect ratios need not be constrained, or may be constrained by any arbitrary ratio. A thumbnail is created for each bounding rectangle BR, and the thumbnail is saved along with the generated tags T(i) included within the corresponding tag rectangles TR(i). Additionally, a thumbnail of the complete image may be created with a bounding rectangle BR(0, 0, imgWidth, imgHeight).

Figure 9:
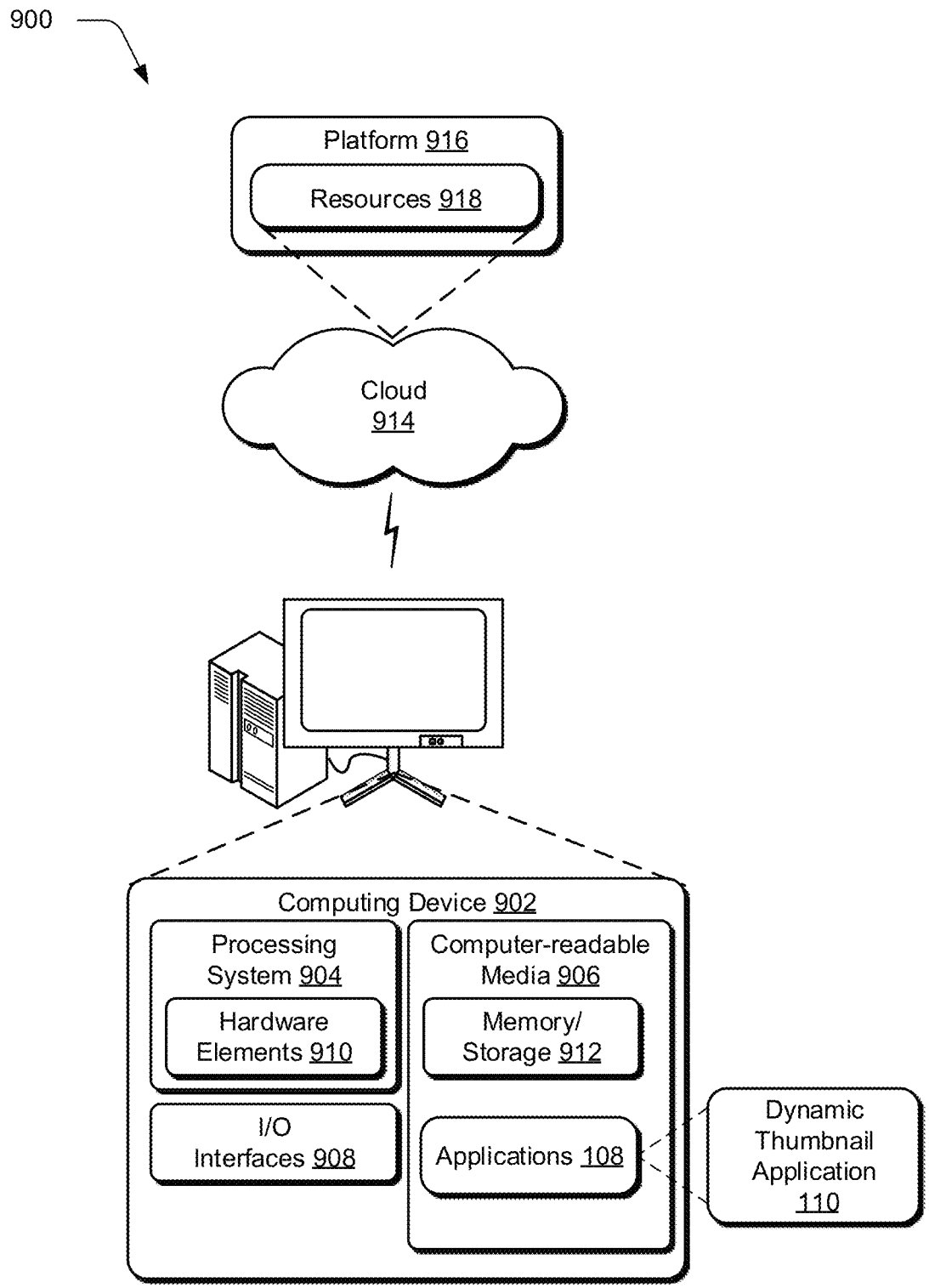
FIG. 9 illustrates an example system including various components of an example device that can be employed for one or more implementations described herein.

The thumbnail selection component 206 is representative of logic implemented at least partially in hardware (e.g., as a processing system and computer-readable storage medium, integrated circuit, and so on as described in relation to FIG. 9) to analyze an input search to select a thumbnail, from a number of thumbnails representing the same image, that best visually represents the content of the input search. The thumbnail selection component 206 receives the thumbnails and corresponding generated tags T(i) from the thumbnail creation component 204, along with the set of unmapped tags U(i) from the image analysis component 202. Further, the thumbnail selection component 206 also receives an input search 216. The input search 216 may include a text query, for example, a text search input to a visual search engine or image database. The text query may include a number of search tags S(i). The thumbnail selection component compares the search tags S(i) to the generated tags T(i) and the unmapped tags U(i) to determine a thumbnail for selection and output. However, the unmapped tags U(i) are not associated with any particular rectangle and therefore no thumbnails have been generated by the thumbnail creation component 204 that are based on the unmapped tags U(i). Due to this, the thumbnail selection component 206 evaluates the impact of the unmapped tags U(i) on the selection of a relevant thumbnail by determining a relevance of the unmapped tags U(i) to a particular input search 216, thus ensuring that a relevant thumbnail is selected despite the presence of unmapped tags U(i).

If there are no unmapped tags U(i) (e.g., every user-entered tag was successfully mapped to a tag rectangle TR(i)), the thumbnail selection component 206 selects a thumbnail that has the highest number of generated tags T(i) that correspond to the search tags S(i).

In the scenario where there is at least one unmapped tag U(i), the thumbnail selection component 206 compares the search tags S(i) to the generated tags T(i) and determines if there is a threshold number of search tags S(i) that do not map to any generated tag T(i). If every search tag S(i) is successfully mapped to a generated tag T(i), the generated thumbnails accurately represent the content that the user is searching for, and the thumbnail selection component 206 selects a thumbnail that has the highest number of generated tags T(i) that correspond to the search tags S(i). If none of the search tags S(i) map to the generated tags T(i), but at least one of the search tags S(i) maps to an unmapped tag U(i), it cannot be determined if any generated thumbnail accurately represents the content that the user is searching for, and the thumbnail selection component 206 selects a thumbnail of the complete image. If some of the search tags S(i) map to the generated tags T(i), and some of the search tags S(i) map to the unmapped tags U(i), the generated thumbnails will at least partially represent the content that the user is searching for. In this case, the thumbnail selection component 206 may assume that the most important parts of the image are represented by the generated tags T(i), and the thumbnail selection component 206 selects a thumbnail that has the highest number of generated tags T(i) that correspond to the search tags S(i).

In some embodiments, the input search 216 is received prior to the creation of thumbnails. In such embodiments, the thumbnail creation component 204 and the thumbnail selection component 206 may be a single component, or may be reversed in order. In either case, search tags are evaluated as described above with reference to the thumbnail selection component 206 and at least one of the search tags is selected as corresponding to one or more of the tag rectangles TR(i). A thumbnail is subsequently generated as described above with reference to the thumbnail creation component 204, with the exception that a single thumbnail is generated based on the selected search tags.

The thumbnail selection component 206 is illustrated as outputting a selected thumbnail 218. The selected thumbnail 218 may be output to a user device, rendered in a user interface of the computing device 102, and/or stored in a format capable of being later output or displayed. For instance, the selected thumbnail 218 may be output as an image file capable of being manipulated by a user. In specific embodiments, the selected thumbnail 218 is output as a result in a visual search engine or image database, and the selected thumbnail 218 contains a link to or is otherwise associated with the input image 208. Having considered an example dynamic thumbnail application, consider now example images that illustrate the techniques described herein.

Visual Example

FIGS. 3-7 depict example images that illustrate the techniques described herein.

Figure 3:
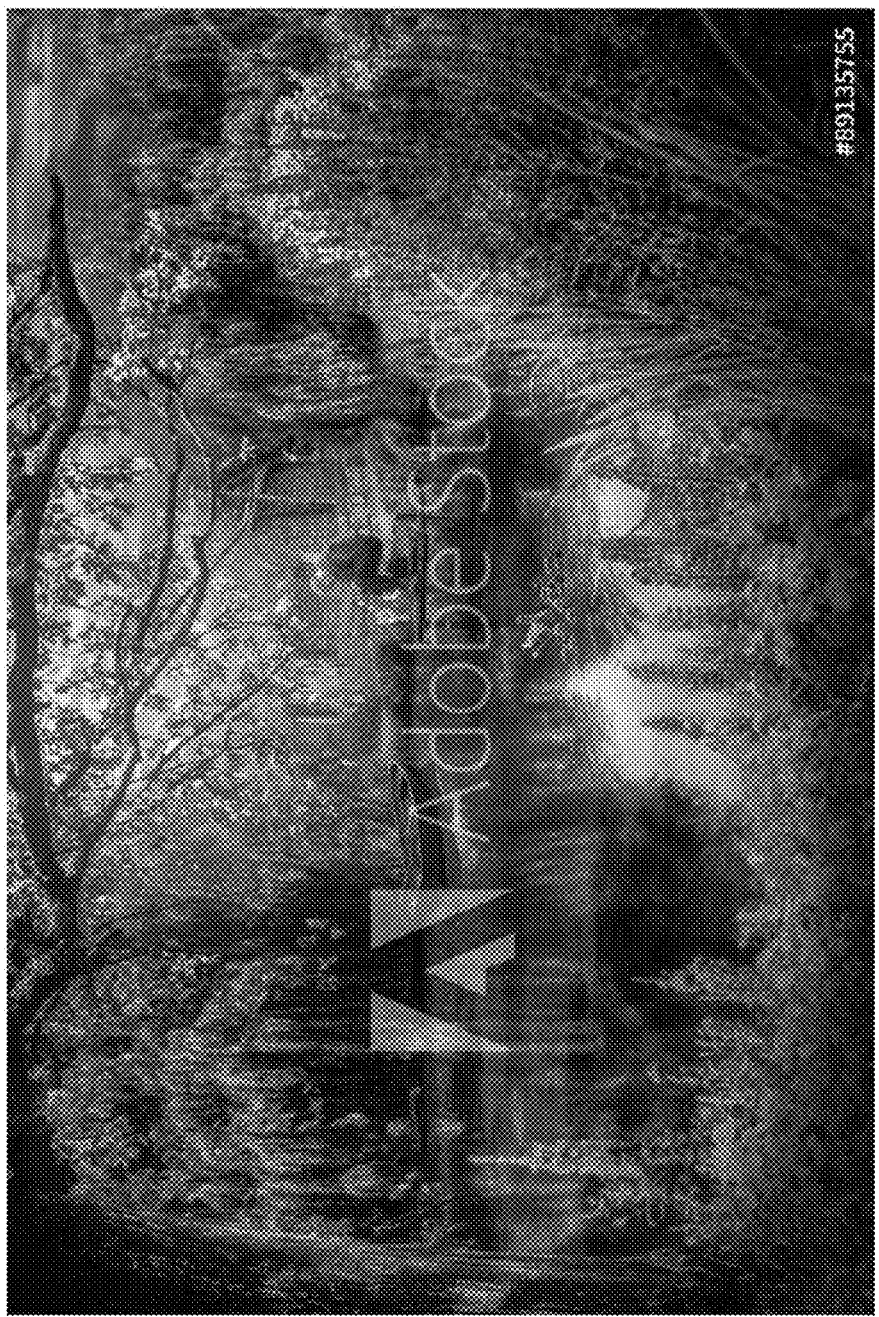
FIG. 3 illustrates an example input image.

FIG. 3 depicts an example input image 300. In this illustration, the example input image 300 is a stock image that includes many objects such as a man, a cat, fishing, a dock, ducks, a lake, a boat, blooming flowers, and so forth.

Figure 4:
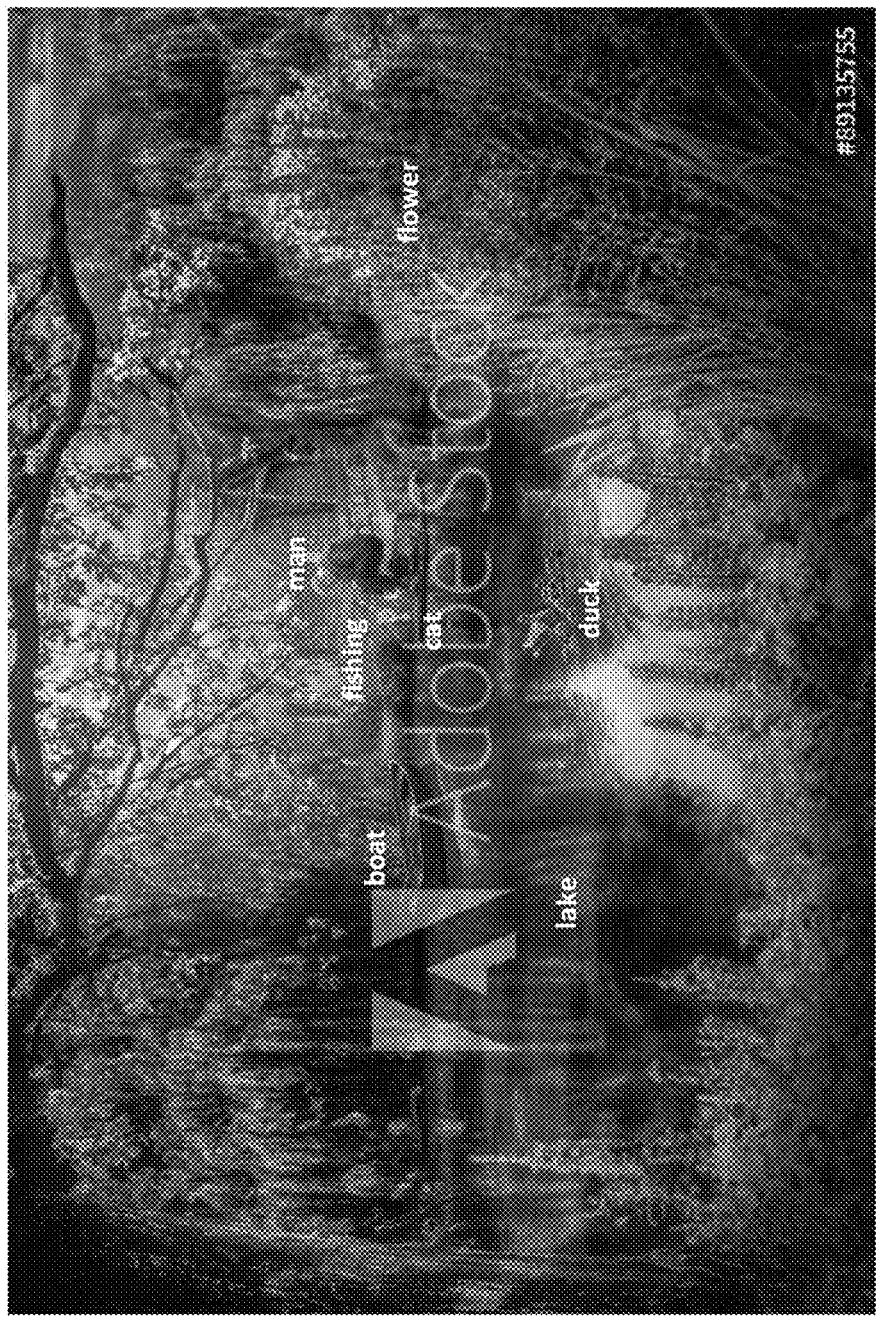
FIG. 4 illustrates the example input image showing example tags.

FIG. 4 illustrates, generally in an image 400, various objects that may have been tagged by a user within the example input image 300. These tags include "boat", "lake", "man", "cat", "fishing", "duck", and "flower". These tags may or may not be associated with any particular location in the example input image 300, and may simply be associated with the example input image 300 as a whole.

Figure 5:
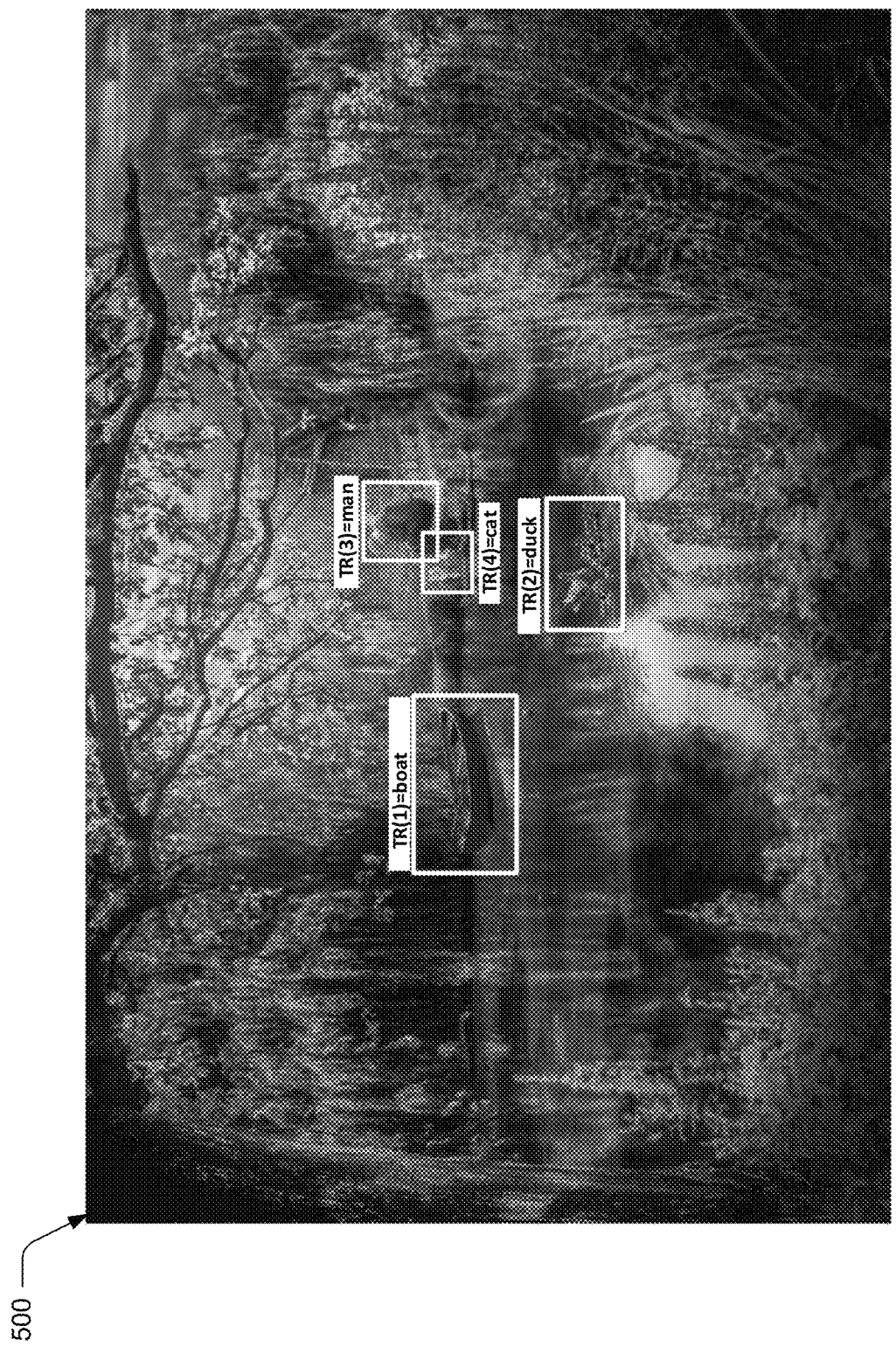
FIG. 5 illustrates the example input image showing example tag rectangles.

FIG. 5 illustrates, generally in an image 500, various tag rectangles that have been generated by the image analysis component 202. The tag rectangles include a tag rectangle TR(1) for "boat" and its corresponding location within the example input image 300, a tag rectangle TR(2) for "duck" and its corresponding location within the example input image 300, a tag rectangle TR(3) for "man" and its corresponding location within the example input image 300, and a tag rectangle TR(4) for "cat" and its corresponding location within the example input image 300.

Figure 6:
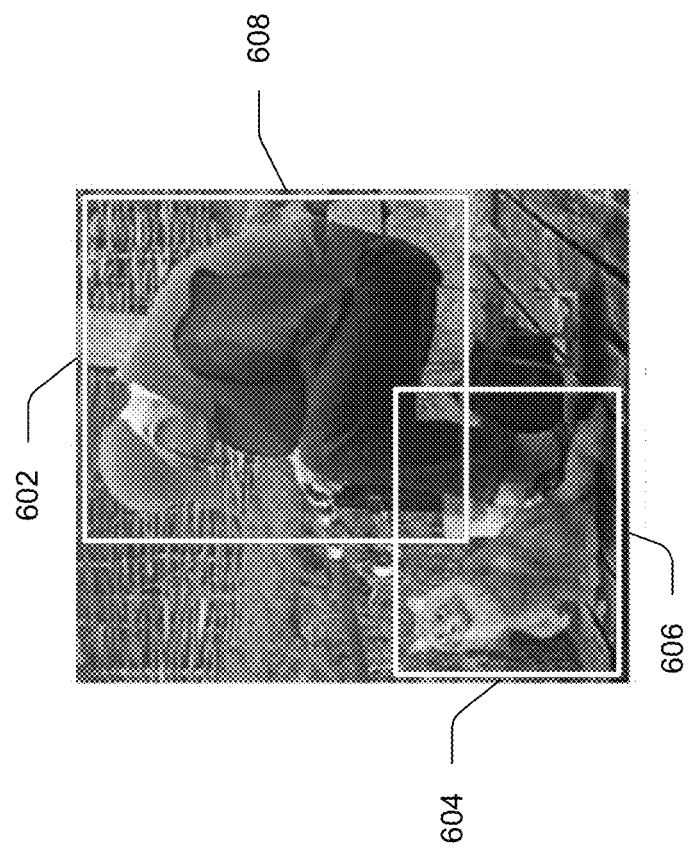
FIG. 6 illustrates the creation of a thumbnail from multiple tag rectangles.

FIG. 6 illustrates in image 600 the creation of a thumbnail by the thumbnail creation component 204. In this example, the thumbnail creation component 204 is creating thumbnails for various combinations of tag rectangles associated with the example input image 300, and is specifically illustrated as creating a thumbnail corresponding to the tag rectangles TR(2) "cat" and TR(3) "man" In some embodiments, a tag rectangle may overlap with another tag rectangle in the same image. Alternatively, a user has searched for the terms "man" and "cat", and the thumbnail creation component 204 is creating a thumbnail only for the tag rectangles associated with "man" and "cat". In either case, the thumbnail creation component 204 has located the corresponding tag rectangles TR(2) "cat" and TR(3) "man". The thumbnail creation component 204 utilizes the rules described above to select a bounding rectangle of BR(top, left, bottom, right) for the thumbnail corresponding to "cat" and "man." In this example, the thumbnail creation component 204 has identified a BR(top) 602 as the top boundary of the tag rectangle TR(3) "man", a BR(left) 604 as the left boundary of the tag rectangle TR(2) "cat", a BR(bottom) 606 as the bottom boundary of the tag rectangle TR(2) "cat", and a BR(right) 608 as the right boundary of the tag rectangle R(3) "Man". Accordingly, the bounding rectangle is determined to be BR(602, 604, 606, 608), and a corresponding thumbnail is created for the tags "cat" and "man".

Figure 7:
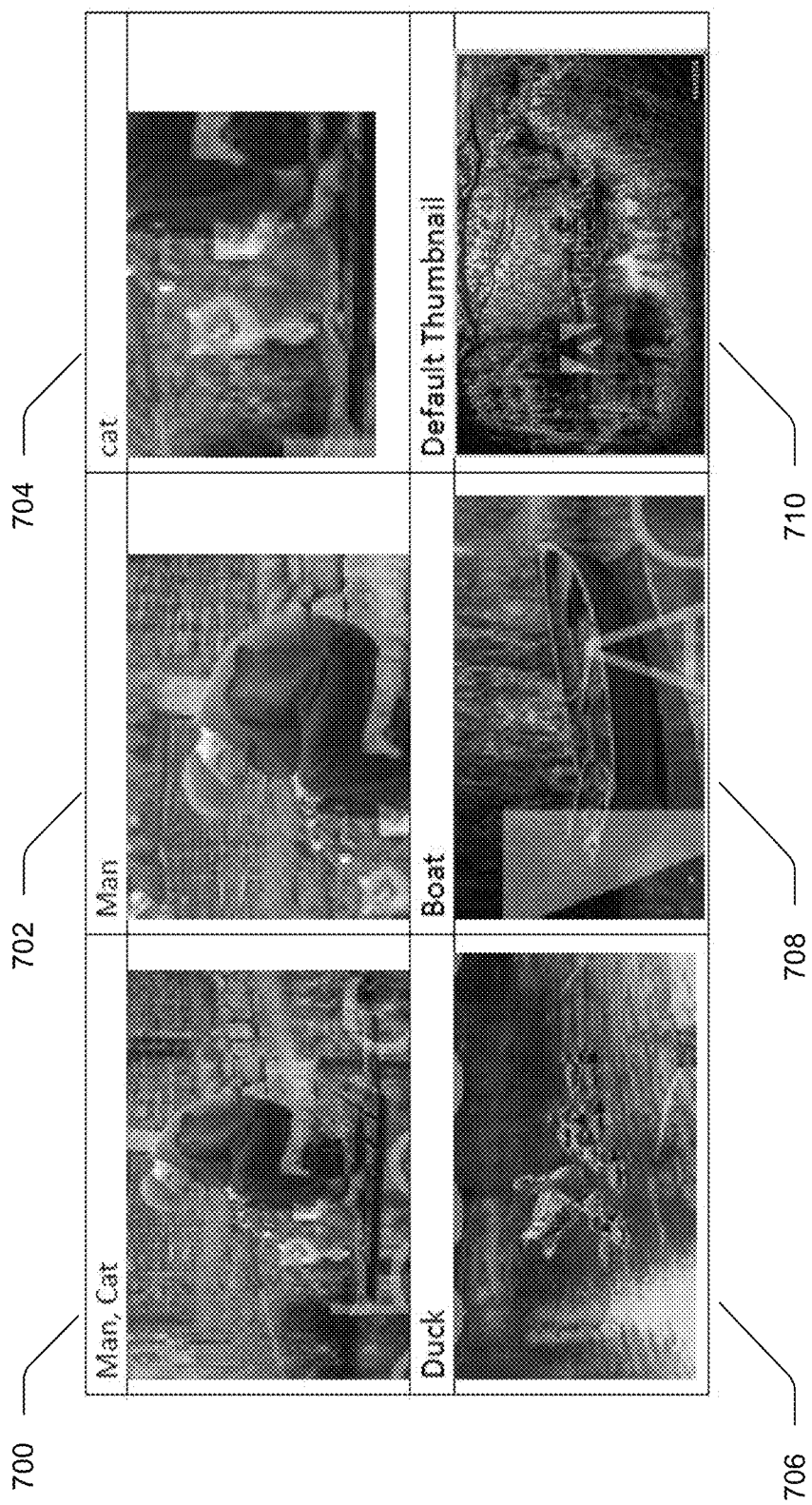
FIG. 7 provides visual examples of dynamic thumbnails.

FIG. 7 depicts example dynamic thumbnails 700, 702, 704, 706, and 708 created from the example input image 300. In each of these examples, a dynamic thumbnail is created that represents different tags within the image. The example dynamic thumbnail 700 was created for the tags "man" and "cat", such as by utilizing the bounding rectangle BR(602, 604, 606, 608) as described in relation to FIG. 6. The example dynamic thumbnail 702 was created for the tag "man". The example dynamic thumbnail 704 was created for the tag "cat". The example dynamic thumbnail 706 was created for the tag "duck". The example dynamic thumbnail 708 was created for the tag "boat". Notice that in each of these example dynamic thumbnails, the user is presented with a thumbnail that shows in detail a feature that is searched for, in contrast to a conventional thumbnail in which none of the individual features are visible. An example thumbnail 710 is a default thumbnail of the entire image, for use where dynamic thumbnails may be undesirable, such as described above in relation to FIG. 2 and the thumbnail selection component 206.

Example Procedure

Figure 8:
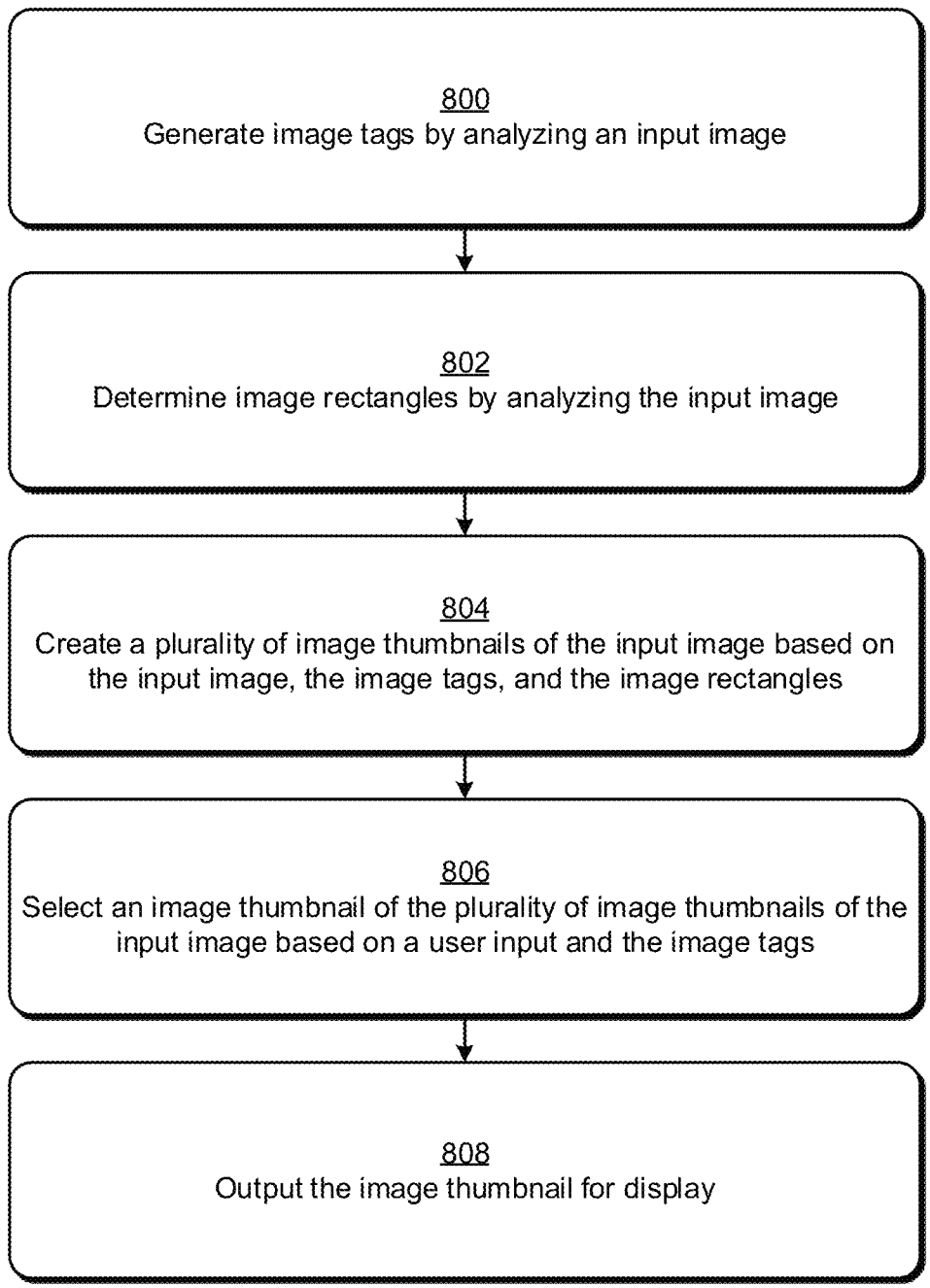
FIG. 8 illustrates a flow diagram that describes operations in accordance with one or more embodiments.

FIG. 8 illustrates an example procedure for creating dynamic thumbnails in accordance with one or more embodiments. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some embodiments the procedure may be performed in a digital medium environment by a suitably configured device, such as the example computing device 102 of FIG. 1 that makes use of the dynamic thumbnail application 110, such as that described above. A dynamic thumbnail application implementing procedure may be an independent application that has been installed on the computing device 102, a service hosted by a service provider that is accessible by the computing device 102, or a plug-in module to the computing device 102. Furthermore, a dynamic thumbnail application implementing procedure may be an application implemented at least partly on a client application of a client device, such as one or more of the user devices 114-1, 114-2, and 114-3.

Referring to FIG. 8, an input image is analyzed to generate image tags at block 800. The input image can be received in any suitable way. For example, the image analysis component 202 receives data representing captured images from a camera or other image capture device. The input image may be received from a camera included as a part of the computing device 102, may be received through the network 116, and so forth. The generating image tags may be performed automatically and without user input, such as by utilizing a Haystack algorithm to compare specific objects within the input image to known images obtained from an image database. Upon a determination that an object in this input image is sufficiently likely to be the same or similar object as depicted in a known image, the identity of the object is retrieved from the known image, for example from metadata associated with the known image, and then saved as a tag for the input image.

Block 802 determines image rectangles by analyzing the input image. Determining image rectangles may be performed automatically and without user input, such as by utilizing a Haystack algorithm to determine bounding rectangle positions that represent the smallest region in which an object identified in block 800 may be confined. In some embodiments, an image rectangle is determined for every tag associated with the input image. However, in other embodiments, an image rectangle is determined for every tag that is generated in block 800 while an image rectangle is not determined for tags that are obtained by other methods, for example, tags obtained directly as a user input.

Block 804 creates a number of image thumbnails of the input image based on the input image, the image tags, and the image rectangles. For example, the thumbnail creation component 204 creates various thumbnails for the same image, such that each thumbnail focuses on or represents a specific object or point of focus within the input image rather than the entire input image. Thumbnails are created by calculating a bounding rectangle that is the smallest bounding rectangle that contains every tag rectangle in a set of tag rectangles. A different thumbnail may be created for every possible set or combination of tag rectangles.

Block 806 selects an image thumbnail of the number of image thumbnails of the input image based on a user input and the image tags. For example, a user of one of the user devices 114 enters an input text into a user interface of the user device 114. The input text may originate in a variety of ways, such as detected using touchscreen functionality of a display device, use of a cursor control device or stylus, detected using a camera and without using touch as part of a natural user interface, use of a keyboard, and so forth. The user input is received by the thumbnail selection component 206, and a thumbnail that best visually represents the content of the user input is selected. The selecting may be performed, for example, by parsing the user input into search tags and comparing the search tags to the image tags associated with each thumbnail. A thumbnail is selected that maximizes tags that are shared between the search tags and the image tags, while minimizing the total number of image tags. In this way, the thumbnail will represent regions of interest to the user while omitting regions that are not of interest to the user. In some embodiments, multiple thumbnails of the same image may be selected, such as when multiple thumbnails are determined to be sufficiently relevant to the user input.

Block 808 outputs the image thumbnail for display. The image thumbnail is configured in a format that may be output or displayed, such as a file capable of being stored on the user device 114 or displayed via a user interface of the user device 114. In some embodiments, the thumbnail is output as a result in a visual search engine or image database. Further, in some embodiments, the thumbnail contains a link or is otherwise associated with the input image. For example, the thumbnail may be displayed on the user device 114 as a result in a visual search engine, and configured with a link such that when the thumbnail is interacted with by the user of the user device 114 the user is redirected to the input image.

Having discussed some example procedures, consider now a discussion of an example system and device in accordance with one or more embodiments.

Example System and Device

FIG. 9 illustrates an example system generally at 900 that includes an example computing device 902 that is representative of one or more computing systems and devices that may implement the various techniques described herein. This is illustrated through inclusion of the applications 108 and, in particular, dynamic thumbnail application 110, which operates as described above. The computing device 902 may be, for example, a server of a service provider, a device associated with a client (e.g., a client device), an on-chip system, or any other suitable computing device or computing system.

The example computing device 902 includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)), nonvolatile media (such as read only memory (ROM), Flash memory, optical disks, magnetic disks, and so forth), or combinations thereof. The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic, fixed device logic implemented in a hardware form, or combinations thereof that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 910, or combinations thereof. The computing device 902 may be configured to implement particular instructions and functions corresponding to the software and hardware modules. Accordingly, implementation of a module that is executable by the computing device 902 as software may be achieved at least partially in hardware, e.g., through use of computer-readable storage media and hardware elements 910 of the processing system 904. The instructions and functions may be executable/operable by one or more articles of manufacture (for example, one or more computing devices 902 or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and is representative of a platform 916 for resources 918. The platform 916 abstracts underlying functionality of hardware (e.g., servers) and software resources of the cloud 914. The resources 918 may include applications, data, or applications and data that can be utilized while computer processing is executed on servers that are remote from the computing device 902. Resources 918 can also include services provided over the Internet, through a subscriber network, such as a cellular or Wi-Fi network, or combinations thereof.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including at least one computing device executing a dynamic thumbnail application, a method for creating dynamic thumbnails, the method comprising:
generating, by the at least one computing device, image tags by analyzing an input image, the image tags including labels describing different visual objects within the input image;
determining, by the at least one computing device, an image rectangle corresponding to each of the image tags by analyzing the input image, each respective image rectangle describing a boundary that contains one of the different visual objects within the input image that is described by the respective image tag;
creating, by the at least one computing device, a plurality of image thumbnails associated with the input image based on the input image, the image tags, and the image rectangles, the plurality of image thumbnails including multiple image thumbnails that are each a different respective combination of the image rectangles and multiple image thumbnails that are the image rectangles;
receiving, by the at least one computing device, an input associated with a search query; and
selecting, by the at least one computing device, an image thumbnail of the plurality of image thumbnails of the input image, the selected image thumbnail having the largest number of the labels of the image tags that correspond to the search query.

2. The method of claim 1, wherein the image tags are generated automatically and without user input.

3. The method of claim 1, wherein the image rectangles are generated automatically and without user input.

4. The method of claim 1, wherein a portion of the image tags are generated automatically and without user input and another portion of the image tags are generated from a user input, and wherein the determining comprises determining an image rectangle corresponding to each of the image tags that are generated automatically and without user input.

5. The method of claim 1, wherein the creating a plurality of image thumbnails comprises creating an image thumbnail for each of a plurality of combinations of the image tags, such that each respective image thumbnail is represented by a boundary including an image rectangle of the image rectangles or the different respective combination of the image rectangles associated with the corresponding image tags.

6. The method of claim 1, wherein the selecting an image thumbnail comprises determining search tags associated with the search query, determining shared tags by comparing the search tags associated with the search query to the labels of the image tags, and selecting an image thumbnail that is associated with a largest number of shared tags.

7. The method of claim 6, wherein the selecting an image thumbnail further comprises determining that two or more image thumbnails are associated with the largest number of shared tags, and selecting one of the two or more image thumbnails that is associated with the smallest number of image tags.

8. The method of claim 1, further comprising outputting, by the at least one computing device, the image thumbnail for display on a display device.

9. The method of claim 1, wherein the labels of the image tags include text describing the different visual objects within the input image.

10. A system implemented in a digital medium environment including a computing device configured to create dynamic thumbnails, the system comprising:
a processing system; and
at least one computer readable medium storing instructions executable via the processing system to implement a dynamic thumbnail application configured to perform operations comprising:
generating image tags by analyzing an input image, the image tags including labels describing different visual objects within the input image;
determining an image portion corresponding to each of the image tags by analyzing the input image, each respective image portion describing a boundary that contains one of the different visual objects within the input image that is described by the respective image tag;
creating a plurality of image thumbnails associated with the input image based on the input image, the image tags, and the image portions, the plurality of image thumbnails including multiple image thumbnails that are each a different respective combination of the image portions and multiple image thumbnails that are the image portions;
receiving an input associated with a search query; and
selecting an image thumbnail of the plurality of image thumbnails of the input image based on the input associated with the search query and the image tags, the selected image thumbnail having the largest number of labels of the image tags that correspond to the search query.

11. The system of claim 10, wherein the image tags are generated automatically and without user input.

12. The system of claim 10, wherein the image portions are generated automatically and without user input.

13. The system of claim 10, wherein a portion of the image tags are generated automatically and without user input and another portion of the image tags are generated from a user input, and wherein the determining comprises determining an image portion corresponding to each of the image tags that are generated automatically and without user input.

14. The system of claim 10, wherein the creating a plurality of image thumbnails comprises creating an image thumbnail for each of a plurality of combinations of the image tags, such that each respective image thumbnail is represented by a boundary including an image portion of the image portions or the different respective combination of the image portions associated with the corresponding image tags.

15. The system of claim 10, wherein the selecting an image thumbnail comprises determining search tags associated with the search query, determining shared tags by comparing the shared tags associated with the search query to the labels of the image tags, and selecting an image thumbnail that is associated with a largest number of shared tags.

16. The system of claim 15, wherein the selecting an image thumbnail further comprises determining that two or more image thumbnails are associated with the largest number of shared tags, and selecting one of the two or more image thumbnails that is associated with the smallest number of image tags.

17. In a digital medium environment including a computing device configured to create dynamic thumbnails, a method for photo text creation, comprising:
  a step for generating image tags by analyzing an input image, the image tags including labels describing different visual objects within the input image;
  a step for determining an image rectangle corresponding to each of the image tags by analyzing the input image, each respective image rectangle describing a boundary that contains one of the different visual objects within the input image that is described by the respective image tag;
  a step for creating a plurality of image thumbnails associated with the input image based on the input image, the image tags, and the image rectangles, the plurality of image thumbnails including multiple thumbnails that are each a different respective combination of the image rectangles and multiple image thumbnails that are the image rectangles;
  a step for receiving an input associated with a search query; and
  a step for selecting an image thumbnail of the plurality of image thumbnails of the input image, the selected image thumbnail having the largest number of the labels of the image tags that correspond to the search query.

18. The digital medium environment as described in claim 17, wherein a portion of the image tags are generated automatically and without user input and another portion of the image tags are generated from a user input, and wherein the step for determining comprises a step for determining an image rectangle corresponding to each of the image tags that are generated automatically and without user input.

19. The digital medium environment as described in claim 17, wherein the step for creating a plurality of image thumbnails is configured to create an image thumbnail for each of a plurality of combinations of the image tags, such that each respective image thumbnail is represented by a boundary including an image rectangle of the image rectangles or the different respective combination of the image rectangles associated with the corresponding image tags.

20. The digital medium environment as described in claim 17, wherein the selecting step is configured to determine search tags associated with the search query, determine shared tags by comparing the input shared tags associated with the search query to the labels of the image tags, and select multiple image thumbnails by maximizing shared tags and minimizing image tags.

* * * * *

UNITED STATES PATENT AND TRADEMARK OFFICE
CERTIFICATE OF CORRECTION

PATENT NO. : 10,878,024 B2  
APPLICATION NO. : 15/492881  
DATED : December 29, 2020  
INVENTOR(S) : Srijan Sandilya et al.

Page 1 of 1

It is certified that error appears in the above-identified patent and that said Letters Patent is hereby corrected as shown below:

In the Claims

Column 18, Line 25 after "comparing the", delete "input".

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*